(12) United States Patent
Griffin et al.

(10) Patent No.: US 9,757,889 B2
(45) Date of Patent: Sep. 12, 2017

(54) NON-CONDUCTIVE WIRE SPLICE CONNECTOR

(71) Applicant: Greaves Corporation, Clinton, CT (US)

(72) Inventors: Peter Griffin, Salem, CT (US); Thomas Speer, Madison, CT (US); Sal Rapacciuolo, New Haven, CT (US)

(73) Assignee: Greaves Corporation, Clinton, CT (US)

( * ) Notice: Subject to any disclaimer, the term of this patent is extended or adjusted under 35 U.S.C. 154(b) by 257 days.

(21) Appl. No.: 14/541,531

(22) Filed: Nov. 14, 2014

(65) Prior Publication Data

US 2015/0136445 A1    May 21, 2015

Related U.S. Application Data

(60) Provisional application No. 61/904,481, filed on Nov. 15, 2013.

(51) Int. Cl.
| | |
|---|---|
| *B29C 47/02* | (2006.01) |
| *B29C 47/00* | (2006.01) |
| *B29L 31/34* | (2006.01) |
| *H01B 13/24* | (2006.01) |

(52) U.S. Cl.
CPC ........ *B29C 47/028* (2013.01); *B29C 47/0014* (2013.01); *B29L 2031/3462* (2013.01); *H01B 13/24* (2013.01)

(58) Field of Classification Search
None
See application file for complete search history.

(56) References Cited

U.S. PATENT DOCUMENTS

| | | | | | |
|---|---|---|---|---|---|
| 1,397,040 | A | * | 11/1921 | Dillon | H01R 4/183 16/108 |
| 3,361,871 | A | * | 1/1968 | Brandt | H01B 3/308 174/112 |
| 3,666,876 | A | * | 5/1972 | Forster | H01B 9/027 174/102 SC |
| 3,781,453 | A | * | 12/1973 | Funk | G21C 17/116 174/11 R |
| 3,889,047 | A | * | 6/1975 | Carver | B29C 61/00 156/49 |
| 4,105,860 | A | * | 8/1978 | Ball | H01B 7/423 174/15.6 |
| 4,501,927 | A | * | 2/1985 | Sievert | H01R 4/70 156/49 |
| 4,830,457 | A | * | 5/1989 | Asada | G02B 6/4448 174/70 R |

(Continued)

*Primary Examiner* — Chau N Nguyen
*Assistant Examiner* — Muhammed Azam
(74) *Attorney, Agent, or Firm* — Bachman & LaPointe, P.C.

(57) ABSTRACT

A non-conductive wire splice apparatus having a connector configured to be coupled between a first wire and a second wire. The connector having a non-conductor coupled between a first sleeve and a second sleeve. The first sleeve being attachable to the first wire. The second sleeve being attachable to the second wire opposite the first sleeve. The non-conductor being configured to electrically insulate the first wire from the second wire. An electrical current in the first wire is insulated from being conducted to the second wire.

14 Claims, 2 Drawing Sheets

(56) References Cited

U.S. PATENT DOCUMENTS

| | | | | |
|---|---|---|---|---|
| 5,670,223 A * | 9/1997 | Sadlo | B29C 66/4329 | 174/135 |
| 6,372,988 B1 * | 4/2002 | Burke | B65H 75/38 | 174/117 F |
| 8,550,842 B1 * | 10/2013 | Gutierrez | H01R 4/36 | 174/74 R |
| 9,613,735 B2 * | 4/2017 | Portas | H01B 13/22 | |
| 2002/0010252 A1 * | 1/2002 | Lecoeuvre | C08K 3/04 | 524/496 |
| 2002/0096352 A1 * | 7/2002 | Kuwayama | H01R 4/20 | 174/74 R |
| 2003/0088144 A1 * | 5/2003 | Terwilliger | A61N 5/1007 | 600/8 |
| 2003/0092958 A1 * | 5/2003 | Terwilliger | A61N 5/1027 | 600/8 |
| 2004/0249054 A1 * | 12/2004 | Eggers | C08L 27/12 | 524/520 |
| 2005/0008871 A1 * | 1/2005 | Sikora | H01B 3/445 | 428/421 |
| 2006/0254799 A1 * | 11/2006 | Gregorek | H01R 4/70 | 174/74 A |
| 2009/0126993 A1 * | 5/2009 | Nishimura | H01B 3/28 | 174/72 A |
| 2010/0158454 A1 * | 6/2010 | Lapp | H01B 7/368 | 385/101 |
| 2010/0166374 A1 * | 7/2010 | Lapp | H01B 7/366 | 385/101 |
| 2010/0172618 A1 * | 7/2010 | Lapp | H01B 7/32 | 385/101 |
| 2011/0036613 A1 * | 2/2011 | Hayashishita | H01B 13/0165 | 174/105 R |
| 2011/0254197 A1 * | 10/2011 | Verner | B29C 61/065 | 264/249 |
| 2012/0125655 A1 * | 5/2012 | Schutt | B29C 45/14336 | 174/93 |
| 2012/0125685 A1 * | 5/2012 | Lamb | C08F 220/18 | 174/84 R |
| 2013/0000974 A1 * | 1/2013 | Igarashi | B60R 16/0215 | 174/70 R |
| 2013/0306370 A1 * | 11/2013 | Sato | H01B 13/24 | 174/72 A |
| 2014/0037956 A1 * | 2/2014 | Sopory | H01B 7/292 | 428/368 |
| 2014/0166340 A1 * | 6/2014 | McLaughlin | H02G 15/1826 | 174/135 |
| 2014/0284099 A1 * | 9/2014 | Saito | H01B 7/2825 | 174/70 R |
| 2014/0284100 A1 * | 9/2014 | Ichikawa | B60R 16/0215 | 174/70 R |
| 2014/0291016 A1 * | 10/2014 | Kajiwara | H01B 13/26 | 174/70 R |
| 2014/0305673 A1 * | 10/2014 | Kulas | H04R 1/1033 | 174/69 |
| 2015/0068800 A1 * | 3/2015 | Yamasaki | B32B 27/18 | 174/72 A |
| 2015/0333494 A1 * | 11/2015 | Yamasaki | B32B 7/12 | 174/72 A |
| 2015/0340848 A1 * | 11/2015 | Nakashima | C08G 18/4825 | 174/72 A |

* cited by examiner

NON-CONDUCTIVE WIRE SPLICE CONNECTOR

BACKGROUND

The disclosure relates to wire connectors. More particularly, the disclosure relates to non-conductive copper wire splice connectors.

Wire conductor cable is typically manufactured from copper material. The copper wire is covered with an insulating cover or insulating jacket. The insulating jacket is applied to the copper wire through various methods. One such method is a continuous jacket extrusion method. Copper wire is provided in certain lengths, such as in lengths of several hundred feet. The lengths of copper wire are fed into machinery which carries the strand of copper wire through various extrusion equipment. It is most beneficial for the extrusion coating process to operate in a continuous mode with as few interruptions in the process as possible. As a first section of wire is processed and coated a second length of wire is fed into the machine and spliced to the trailing end of the first section of wire. The lengths of conductor wire are spliced together with a copper butt splice. A conventional sleeve of cylindrical shape is fitted over the ends of the two lengths to be spliced and crimped or otherwise crushed down onto the conductor wire ends in order to hold the two wire lengths together. The splice diameter has physical size limitations. The splice must not be larger in diameter than the conductor wire. This requirement is paramount for larger sizes. The purpose of limiting the splice diameter is so that the splice will run through the extrusion head and fit within the spindle grooves of the processing equipment. Splices are installed on a stationary bench, where the wire cable is held motionless. The process machinery includes accumulators that allow for the wire to be held motionless for several minutes in order to facilitate the splice installation.

The wire splice is marked or tagged to indicate the location of the splice. The splice tag is done during the processing between extrusion and the continuous vulcanization (CV) steps. The purpose of marking the splice location is to facilitate removing the splice after the CV pass of the process. The process equipment operator performs a calculation of exactly when the splice will exit the CV step of processing. The operator will manually locate the splice and remove it. It is essential to remove the splice before the coated conductor is shipped. However, in certain instances, the splice is not removed before shipment. The splice is overlooked and remains in the length of coated conductor. Since the splice is a conductive member of the wire lengths, the splice is not detected in normal conductor testing. Having the conductive splice ship to the customer has very negative consequences. The function of the coated copper conductor is compromised. The reputation of the manufacturer is also irreparably damaged.

The machinery used at some facilities is the same for all sizes of wire. In order to maintain a straight smooth pass of wire through the equipment, in-line cable tension is maintained. For example, for a 535 DLO line, 1,100 pounds of in-line tension is required. In another example, for a 777 DLO about 1,500 pounds of in-line tension is required. Smaller sizes of wire require less tension, such as a few hundred pounds for a #6 wire. In another example, a 2,000 mcm Class B wire is likely to have 3,000 pounds of in-line tension. The splice must also withstand these high process mechanical tension limits. It is important that the splice maintains its mechanical integrity during processing. If for example, a splice is not properly installed, and a mechanical failure results, the splice can be pulled apart inside the CV tube. The result will be a process line stoppage. The process machine will have to be cleared and then restarted. It can result in unwanted costly process down-time. Hours of process time can be lost in clearing the defective splice and restarting the process machinery.

There exists in the art of coated wire conductor a need to have a device that can splice wire lengths during continuous jacket extrusion processing with the capacity to maintain structural integrity while having properties that allow for reliable detection to facilitate removal of the splice before shipping to a customer.

For a more thorough description of the wire coating process the material of the book titled Extrusion: The Definitive Processing Guide and Handbook by Harold F. Giles, Jr., John R. Wagner, Jr., and Eldridge M. Mount, published by Elsevier 2008, with ISBN 978-1-4377-3481-2 is incorporated-by-reference herein.

SUMMARY

One aspect of the disclosure involves a non-conductive wire splice apparatus having a connector configured to be coupled between a first wire and a second wire. The connector has a non-conductor coupled between a first sleeve and a second sleeve. The first sleeve is attachable to the first wire. The second sleeve is attachable to the second wire opposite the first sleeve. The non-conductor is configured to electrically insulate the first wire from the second wire. An electrical current in the first wire is insulated from being conducted to the second wire by the non-conductive connector.

In various implementations, the non-conductor is mechanically coupled between the first sleeve and the second sleeve and is configured to flex. The non-conductor includes a central portion located between two opposing spherical ends attachable to an attachment portion of the first sleeve and the second sleeve respectively.

In another embodiment a method of splicing two wires in a continuous jacket extrusion process includes feeding a first wire through a continuous jacket extrusion process mechanism. The process includes feeding a second wire through the continuous jacket extrusion process mechanism. The process includes splicing the first wire to the second wire with a connector having a non-conductor coupled between a first sleeve and a second sleeve. The splicing step includes attaching the first sleeve to the first wire and attaching the second sleeve to the second wire. The method includes detecting the non-conductor spliced between the first wire and the second wire.

The method also includes detecting the non-conductor by passing an electrical current through the first wire to the second wire and observing a break in electrical continuity between the first wire and second wire assembly.

In another embodiment, a non-conductive wire splice comprises a connector coupled between a first wire and a second wire, the connector has a non-conductor coupled between a first sleeve and a second sleeve. The first sleeve is attached to the first wire. The second sleeve is attached to the second wire opposite the first sleeve. The non-conductor includes a central portion located between two opposing shaped ends attached to an attachment portion of the first sleeve and the second sleeve respectively. The non-conductor electrically insulates the first wire from the second wire. An electrical current in the first wire is insulated from being conducted to the second wire.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
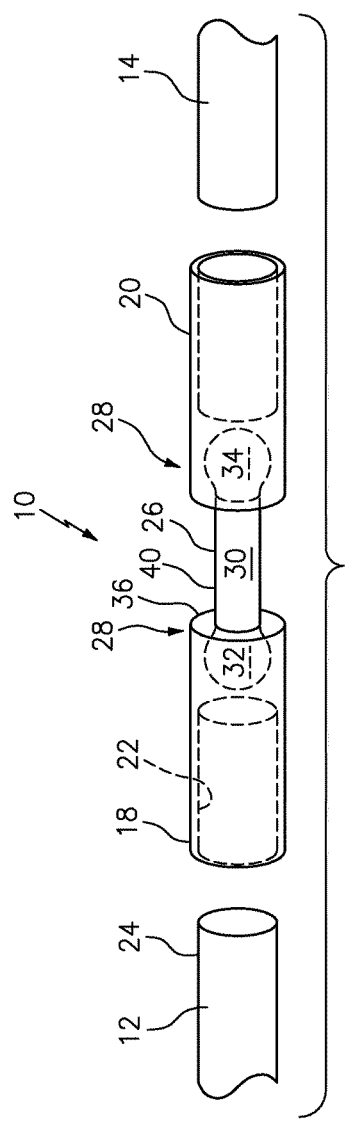
FIG. 1 is an exploded view of an exemplary non-conductive connector.
Figure 2:
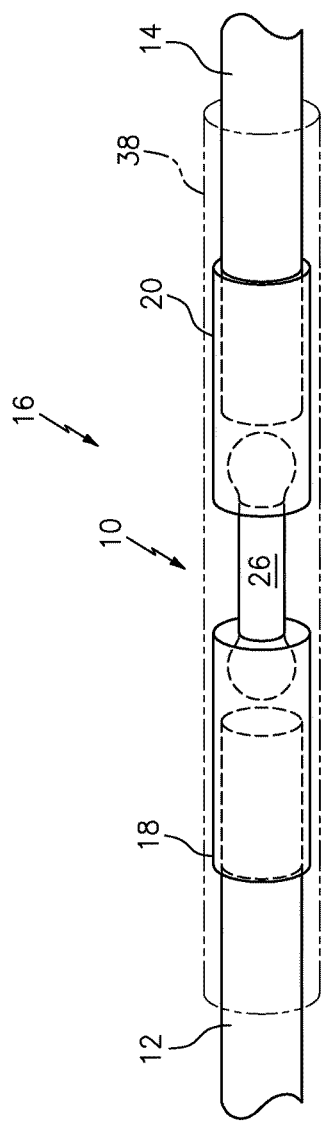
FIG. 2 is an assembly view of an exemplary non-conductive connector.

FIGS. 1 and 2 show a connector 10 for joining a first wire 12 to a second wire 14. The first wire 12 and second wire 14 represent lengths of wire to be joined end-to-end in a splice 16 so that the first wire 12 and second wire 14 can be processed in a continuous manner. For example, the first wire 12 and second wire 14 can be spliced to facilitate a continuous jacket extrusion process.

The connector 10 includes a first sleeve 18 proximate the first wire 12. A second sleeve 20 is proximate the second wire 14. The first sleeve 18 is configured to couple to the first wire 12 in a fixed manner such that the first sleeve inner diameter 22 connects in a fixed manner over the first wire outer diameter 24. The first sleeve 18 connects to the first wire 12 with enough mechanical force so as to resist the tensile forces applied to the first wire 12 during the extrusion process to prevent the first wire 12 from decoupling from the first sleeve 18. The connection can be accomplished through mechanical deformation of the sleeve 18 such as by crimping, crushing, stamping and the like. The connection can also be made by bonding, adhesion, and similar thermal, chemical material processes. It is contemplated that the second sleeve 20 and second wire 14 can be connected in a similar manner. The first sleeve 18 and second sleeve 20 can be made of copper, copper alloy, steel alloy, and any other materials that possess the appropriate structural, and physical characteristics necessary to function as described herein.

A non-conductor 26 is coupled between the first sleeve 18 and the second sleeve 20. The non-conductor 26 has properties that resist conductivity of electrical current and actually insulate and prevent the flow of electrical current. The non-conductor 26 also possesses material properties of mechanical strength sufficient to resist the tensile, and bending forces applied to it during the extrusion processes, such that the non-conductor 26 remains intact and does not fracture or fail to the point of releasing the physical connection between the first sleeve 18 and second sleeve 20, resulting in a failure of the splice 16 between the first wire 12 and second wire 14. The non-conductor 26 can be made of ceramic materials, glass/resin composites, non-metal materials, plastics, dielectric materials with electrical insulation properties and the like.

The mechanical connection or coupling 28 between the non-conductor 26 and the first sleeve 18 as well as the non-conductor 26 and second sleeve 20 can be formed in a variety of shapes and configurations. The ability of the coupling 28 to allow for freedom of motion, flexibility, and a non-rigid quality within the splice 16 is contemplated. These characteristics allow the connector 10 to move through the mechanisms of the extrusion process, such as, travel over spindles, without binding or fracturing. The splice 16 should be sufficient to allow for the first wire 12 and second wire 14 to pass through the machinery without being disconnected. The exemplary embodiment shown in the figures includes a coupling 28 having a central portion 30 between spherical shaped ends 32, 34. The first sleeve 18 includes an attachment portion 36 that is formed to contour with the spherical shaped end 32 to allow for movement while being fixed against tensile forces maintaining the integrity of the connection along the axis of the splice 16 to maintain a coaxial relationship. The second sleeve 20 includes a similar coupling 28 and attaches to the spherical shaped end 34 in the same manner. In alternative embodiments, the coupling 28 can be configured to allow for more flex or for less flex. In alternative embodiments, there may be only a single flexible coupling 28 for the connector 10.

In an exemplary embodiment, the first sleeve 18 and second sleeve 20 can be configured as conventional butt splice designs. The non-conductor 26 can include ends 32, 34 that have shapes conducive to proper attachment to the sleeves 18, 20, including but not limited to ridges, nubs, spiral ridges, rings, dimples, notches and the like.

In another exemplary embodiment, the first sleeve 18 and second sleeve 20 can be integral with the non-conductor 26. The non-conductor 26 can prevent the conductivity of electricity from the first wire 12 to the second wire 14. The formation of the connector 10 with the two sleeves 12, 14 and non-conductor 26 in an integral structural design can simplify installation and manufacture of the connector 10.

In another exemplary embodiment, the non-conductor 26 can be a composite material made up of more than one material. The non-conductor 26 as a composite material can possess the electrical insulating properties as well as the mechanical strength to properly function with the connector 10. The non-conductor 26 can include an outer portion 40 covering the central portion 30 and shaped ends 32, 34. The outer portion 40 can include electrical insulating properties that results in the effect of insulating electrical current. The central portion 30 and shaped ends 32, 34 can comprise materials that may be electrically conductive and also possess properties of mechanical strength so as to resist the tensile and compressive forces exerted on the connector 10.

The connector 10 can be passed through the continuous jacket extrusion process acting as an efficient splice 16 between the first wire 12 and second wire 14 allowing for application of the jacket 38 over the wire 12, 14.

The connector 16 can be exposed to a variety of temperatures depending on the material of the jacket 38. For example, the extrusion material can be polymer, rubber, or silicone materials. For a typical rubber extrusion, temperatures of about 220 degrees Fahrenheit can be experienced with an additional 375 to about 380 degrees Fahrenheit during a steam application through the continuous vulcanization. The polymer materials can be exposed to about 220 degrees Fahrenheit through extrusion and additionally, 375 to about 380 degrees Fahrenheit during pressurized liquid continuous vulcanization.

The connector 10 must provide the necessary level of electrical insulation, resistance to thermal energy, mechanical tension, and the geometric limits of the process equipment encountered during the extrusion process.

One or more embodiments have been described. Nevertheless, it will be understood that various modifications may be made. For example, it is contemplated in an alternative embodiment, that an insulating layer be inserted between the inner diameter of a conventional copper butt splice and the wires being joined by the butt splice. The insulating layer electrically insulates the first wire 12 electrical current to/from the second wire 14. In this alternative embodiment, the normally electrically conductive copper butt splice no longer has the capacity to conduct electrical current. The splice is then more easily detected during post extrusion electrical testing. Accordingly, other embodiments are within the scope of the following claims.

What is claimed:

1. An apparatus comprising:
    a connector configured to be coupled in series between a first wire and a second wire joined end-to-end in a splice,
    said connector having a non-conductor coupled between a first sleeve and a second sleeve, said first sleeve attachable to said first wire, said second sleeve attachable to said second wire opposite said first sleeve; and
    said non-conductor configured to electrically insulate said first wire from said second wire, wherein an electrical current in said first wire is insulated from being conducted to said second wire.

2. The apparatus of claim 1 wherein said non-conductor is mechanically coupled between said first sleeve and said second sleeve configured to flex.

3. The apparatus of claim 1 wherein said non-conductor includes a central portion located between two opposing spherical ends attachable to an attachment portion of said first sleeve and said second sleeve respectively.

4. The apparatus of claim 1 wherein said first sleeve and said second sleeve are integral with said non-conductor.

5. The apparatus of claim 1 wherein said non-conductor comprises a composite material.

6. The apparatus of claim 1 wherein said non-conductor comprises an outer portion covering a central portion and two opposing shaped ends, wherein said outer portion comprises electrical insulating properties configured to electrically insulate said non-conductor.

7. The apparatus of claim 6, wherein said central portion and said two opposing shaped ends are electrically conductive.

8. The apparatus of claim 6, wherein said shaped ends are selected from the group consisting of ridges, nubs, spiral ridges, rings, dimples and notches.

9. A method comprising:
    feeding a first wire through a continuous jacket extrusion process mechanism;
    feeding a second wire through said continuous jacket extrusion process mechanism;
    splicing said first wire to said second wire with a connector having a non-conductor coupled between a first sleeve and a second sleeve;
    wherein splicing comprises attaching said first sleeve to said first wire and attaching said second sleeve to said second wire; and
    detecting said non-conductor spliced between said first wire and said second wire.

10. The method of claim 9 wherein detecting said non-conductor includes passing an electrical current through said first wire to said second wire; and
    observing a break in electrical continuity along said first wire and second wire assembly.

11. The method of claim 9 wherein said connector having a non-conductor coupled between a first sleeve and a second sleeve, said first sleeve attachable to said first wire, said second sleeve attachable to said second wire opposite said first sleeve.

12. The method of claim 11 wherein said non-conductor includes a central portion located between two opposing spherical ends attachable to an attachment portion of said first sleeve and said second sleeve respectively.

13. The method of claim 9 wherein said non-conductor comprises an outer portion covering a central portion and two opposing shaped ends, wherein said outer portion comprises electrical insulating properties configured to electrically insulate said non-conductor.

14. A non-conductive wire splice comprising:
    a connector coupled between a first wire and a second wire,
    said connector having a non-conductor coupled between a first sleeve and a second sleeve, said first sleeve attached to said first wire, said second sleeve attached to said second wire opposite said first sleeve; wherein said non-conductor includes a central portion located between two opposing shaped ends attached to an attachment portion of said first sleeve and said second sleeve respectively; and
    said non-conductor electrically insulates said first wire from said second wire, wherein an electrical current in said first wire is insulated from being conducted to said second wire.

* * * * *